Nov. 18, 1952 — G. C. CURTIS — 2,618,171
FOOTREST AND AUXILIARY THROTTLE PEDAL FOR VEHICLES
Filed July 3, 1950
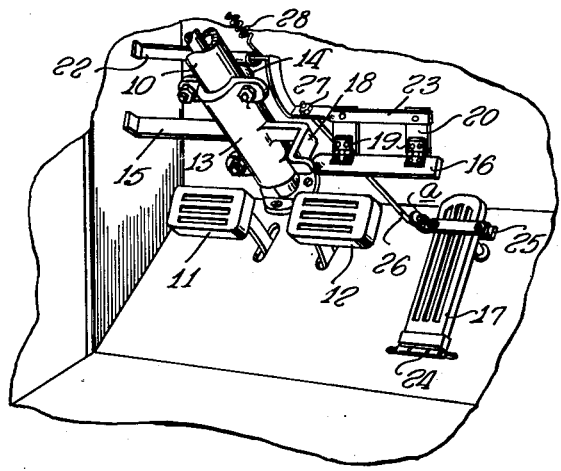
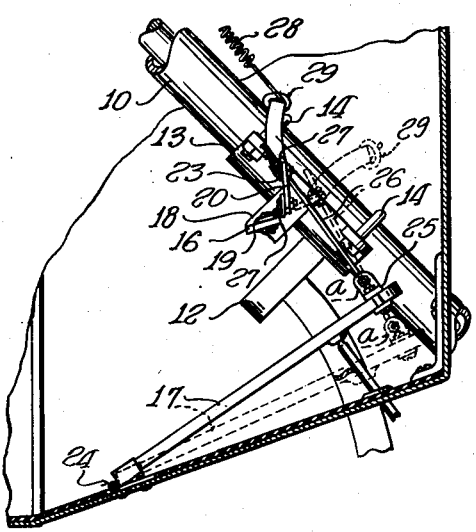
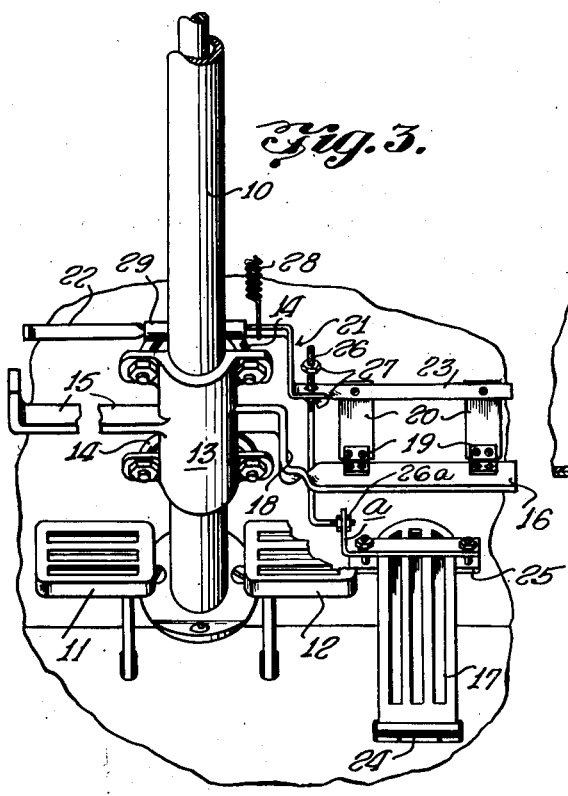
GROVER C. CURTIS
INVENTOR.
BY
ATTORNEY

UNITED STATES PATENT OFFICE 2,618,171

FOOTREST AND AUXILIARY THROTTLE PEDAL FOR VEHICLES

Grover C. Curtis, Bryan, Tex.

Application July 3, 1950, Serial No. 171,995

5 Claims. (Cl. 74—562.5)

This invention relates to equipment for motor vehicles and more particularly to a foot rest and auxiliary throttle pedal for automobiles.

The principal object of the invention is to provide a combination foot rest and throttle pedal which, by virtue of a novel form of mounting adapted for attachment to the steering column of the vehicle, the invention is adaptable to all makes of automobiles, trucks and buses and affords a medium of comfort to the operators of vehicles, especially during long periods of driving. Moreover, the invention provides a foot rest for both feet, situated in close adjacency to the clutch and brake pedals for quick and safe transfer of the foot from the rest to a clutch or brake pedal.

Another object of the invention is to provide a combined foot rest and auxiliary throttle pedal consisting of a saddle attached rigidly to the steering column and having oppositely directed members disposed directly above the foot pedals and conventional throttle pedal, to support on each side of the steering column the feet of the vehicle operator. A member hinged to one of the foot supports and attached adjustably to the main or conventional throttle pedal provides a means operable by either foot to atcuate the main throttle pedal and hence is referred to herein as an auxiliary throttle pedal.

Other objects will appear as the description proceeds, taken in connection with the accompanying drawing, wherein:

Figure 1 is a perspective view of the combined foot rest and auxiliary throttle pedal shown attached to the steering column of an automobile.

Figure 2 is a side elevational view of the invention, and

Figure 3 is a front elevational view thereof.

Continuing with a more detailed description of the drawing, reference numeral 10 denotes generally the steering column of an automobile, while numerals 11 and 12 denote respectively the clutch and brake pedals thereof.

It will become apparent in the course of the description of the invention that the latter may be attached to the steering column in any suitable fashion but for purposes of illustration, a saddle member 13, clamped to the steering column 10 by means of U-bolts 14, provides a mounting for laterally directed horizontal foot rests 15 and 16 one on each side of the steering column, immediately above tne clutch and brake pedals 11 and 12 and the main accelerator pedal 17.

The foot rest 16 at the right of the steering column 10 above the throttle petal 17 is purposely made lower than the companion foot rest by two right angular bends, producing the angular offset 18. Attached to the foot rest 16 are spaced apart hinges 19 and to these hinges, in turn, are affixed at their lower ends links 20. The links 20 are attached at their upper ends to a metal strap 21 whose end portions 22 and 23 are above and generally parallel with the foot rests 15 and 16, respectively and which constitute the auxiliary throttle pedals referred to.

The main throttle pedal 17 is hinged in the conventional manner at 24 to the floorboard of the vehicle and, to accommodate the invention, a clamp 25 is attached to the upper end of the throttle pedal 17 and has an upturned ear $a$ apertured to receive the offset lower end of a rod 26, which is threaded to receive nuts 26a opposing the said upturned portion $a$ to hold the end of the rod against displacement. The upper end of rod 26 is threaded and passed through an aperture in the end portion 23 of strap 21 adjacent the steering column 10. The aperture in the said end portion 23 is of greater diameter than the rod 26 and the nuts 27, threaded onto the ends of the rod 26 on each side of the auxiliary throttle pedal 23 are spaced sufficiently far apart to permit relative movement of the rod and the strap 21 and these nuts further serve to adjust the effective length of the rod 26 in relation to the distance between the main throttle pedal 17 and the auxiliary throttle pedal 23, to accommodate the same to automobiles of various makes and designs.

The end portions 22 and 23 disposed as they are in relation to the foot rests 15 and 16, respectively serve as auxiliary throttle pedals for these foot rests. If a driver desires to relieve a cramped position of the legs caused by long periods of driving without change, he may lift one or both feet to the foot rests 15 and 16 and may depress the main throttle pedal 17 by pressure of the toe of the shoe against either the portion 22 or the portion 23 of the auxiliary throttle pedal, using the foot rest 15 or 16 as a fulcrum at the instep in rocking the foot to actuate the auxiliary throttle pedal. When the auxiliary throttle is depressed, the main throttle pedal 17 is depressed a like amount through the rod 26. While the standard spring return of the main throttle pedal 17 may be sufficient to return the auxiliary throttle pedal to its original position when depressed, an auxiliary spring 28 is provided to insure this action and is attached at its lower end to the auxiliary throttle member 21 at its approximate midsection and at its upper end (not shown) at some convenient point adjacent the top of the steering column.

While in inoperative position, the auxiliary throttle pedal member 21 rests against the back side of the steering column 10, held so by the spring 28. As a cushion for the member 21, a rubber sleeve 29 is mounted thereon at the point where it engages the column 10.

Manifestly, the construction as shown and described is capable of some modification and such modification as may be construed to fall within the scope and meaning of the appended claims is also considered to be within the spirit and intent of the invention.

What is claimed is:

1. An auxiliary throttle pedal and foot rest for an automobile comprising, in combination with the steering column and throttle pedal of said automobile, a semi-cylindrical saddle member attached rigidly to said steering column defining a mounting member, a foot rest affixed to and extending laterally from each side of said mounting member above said automobile throttle pedal, an auxiliary throttle pedal above and having end portions parallel with said foot rest, links hingedly connecting said auxiliary throttle pedal to the foot rest above said automobile throttle pedal, a rod adjustably connecting said auxiliary throttle pedal to said automobile throttle pedal and spring means effecting return of said auxiliary throttle pedal from depressed position.

2. A combined foot supporting means and auxiliary throttle pedal for an automobile comprising, in combination with the main throttle pedal and steering column of said automobile, a saddle detachably connected to said steering column, a foot rest connected to and extending laterally from each side of said saddle, one of said foot rests overlying said main throttle pedal, an auxiliary throttle pedal having end portions parallel with said foot rests above the same, means hingedly connecting one end portion of said auxiliary throttle pedal to one of said foot rests, and means adjustably connecting said auxiliary throttle pedal to said main throttle pedal for common movement therewith.

3. An auxiliary throttle pedal and foot supporting means for a motor vehicle having a steering column and a main throttle pedal, a rigid member stationary with and extending horizontally outward from each side of said steering column above the plane of said main throttle pedal to define a foot support, a second member hingedly attached to one of said rigid members and having portions above and parallel with said rigid members, a rod adjustably connecting said second member to said main throttle pedal whereby movement of said second member will impart like movement to said main throttle pedal, and spring means resisting downward displacement of said second member.

4. A combined foot rest and auxiliary throttle pedal for a motor vehicle having a steering column and main throttle pedal, a saddle detachably mounted on said steering column, a foot rest rigidly attached to said saddle and disposed above said main throttle pedal, an auxiliary throttle pedal hingedly attached to said foot rest in substantial parallelism therewith, a rod connecting said auxiliary throttle pedal to said main throttle pedal for common movement therewith and spring means resisting depression of said auxiliary throttle pedal.

5. An auxiliary throttle pedal and foot rest for an automobile, in combination with the main throttle pedal and steering column of an automobile, a U-shaped saddle attached to said steering column, a rigid member affixed to said saddle and disposed horizontally above said main throttle pedal, an auxiliary throttle pedal, a pair of links hingedly connecting said auxiliary throttle pedal to said rigid member above the same, rod means adjustably connecting said main throttle pedal and said auxiliary throttle pedal whereby movement of one will correspondingly displace the other of said throttle pedals, and spring means resisting downward displacement of said auxiliary throttle pedal.

GROVER C. CURTIS.

REFERENCES CITED

The following references are of record in the file of this patent:

UNITED STATES PATENTS

| Number | Name | Date |
|---|---|---|
| 688,416 | Hopphan | Dec. 10, 1901 |
| 1,214,619 | Van Derbeck | Feb. 6, 1917 |
| 1,281,854 | Schwartz | Oct. 15, 1918 |
| 1,898,640 | Moss | Feb. 21, 1933 |
| 2,084,932 | Allen | June 22, 1937 |
| 2,253,850 | Fisher | Aug. 26, 1941 |
| 2,468,977 | Hobbs | May 3, 1949 |